US010168488B1

(12) United States Patent
Fabian (10) Patent No.: US 10,168,488 B1
(45) Date of Patent: Jan. 1, 2019

(54) TOOL-LESS FERRULE RETAINER (71) Applicant: TE Connectivity Corporation, Berwyn, PA (US)

(72) Inventor: David James Fabian, Mount Joy, PA (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 0 days.

(21) Appl. No.: 15/690,598

(22) Filed: Aug. 30, 2017

(51) Int. Cl.
*G02B 6/36* (2006.01)
*G02B 6/38* (2006.01)

(52) U.S. Cl.
CPC ......... *G02B 6/3869* (2013.01); *G02B 6/3821* (2013.01)

(58) Field of Classification Search
USPC .............................................. 385/77–78, 135
See application file for complete search history.

(56) References Cited

U.S. PATENT DOCUMENTS

| 5,967,809 | A | * | 10/1999 | Fink | .................. | H01R 13/4361 |
| | | | | | | 439/157 |
| 6,601,933 | B1 | * | 8/2003 | Greenwald | .......... | H05K 7/1489 |
| | | | | | | 312/330.1 |
| 6,767,034 | B2 | * | 7/2004 | Le Clinche | ......... | F16L 37/0982 |
| | | | | | | 285/308 |
| 9,118,142 | B2 | * | 8/2015 | Nagasaki | ........... | H01R 13/6275 |
| 2015/0185423 | A1 | * | 7/2015 | Matsui | .................... | G02B 6/389 |
| | | | | | | 385/77 |
| 2016/0109661 | A1 | * | 4/2016 | Foung | .................. | G02B 6/3893 |
| | | | | | | 385/76 |
| 2016/0291259 | A1 | * | 10/2016 | Kanno | ................. | G02B 6/3814 |

* cited by examiner

*Primary Examiner* — Eric Wong (57) ABSTRACT

Ferrule retainer for retaining a ferrule and a spring in a connector body, said connector body defining at least one cavity and at least one first latch element adjacent said cavity, said ferrule retainer comprising a retainer body configured for insertion into said cavity; a resilient member attached to said retainer body, said resilient member having a relaxed state, and comprising at least one second latch element configured for releasibly engaging said at least one first latch element; and an actuator slidably mounted for forward and backward movement on said retainer body, said actuator having an actuated and an unactuated state, in said actuated state, said actuator bends said resilient member, thereby causing said at least one second latch element to move laterally relative to its position when said resilient member is in its relaxed state, and, in said unactuated state, said actuator does not significantly bend/flex said resilient member.

12 Claims, 6 Drawing Sheets

FIG. 6 under the US 10,168,488 B1

TOOL-LESS FERRULE RETAINER

FIELD OF INVENTION

The present invention relates, generally, to optical connectors, and, more specifically, to an optical connector configured for tool-less removal of a ferrule from the connector.

BACKGROUND

A typical optical fiber connector comprises a ferrule disposed in a connector body. The ferrule assembly is often biased forward in the connector body by a spring. The ferrule and spring, if used, are held within the connector body by a ferrule retainer. Of particular interest herein is the ferrule retainer.

Often there is a need to replace, repair or clean the ferrule within a connector. To this end, the ferrule retainer must be removed to allow the ferrule to be pulled from the connector body. As a matter of convenience, "tool-less" ferrule retainers are often preferred such that the ferrule retainer can be installed in and removed from the connector body without the use of specialized tools.

Although tool-less ferrule retainers may be convenient, their applicability to high-connector density configurations can be problematic. For example, Applicants recognize that accessing a ferrule retainer is often difficult when the connectors are closely packed. Specifically, one conventional tool-less approach involves squeezing the ferrule retainer to release it from the connector body. However, often there is little or no space on the side of the connector for the user to insert his/her fingers to squeeze the ferrule retainer. Additionally, Applicants recognize that conventional tool-less ferrule retainers tend to rely on plastic and other polymeric materials, which tend to degrade or otherwise lose their resiliency over time in high-temperature applications, thereby compromising the connection of the ferrule retainer to the connector body.

Therefore, Applicants have identified a need for an improved tool-less ferrule retainer that lends itself to high-temperature and high-density connector applications. The present invention fulfills this need among others.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention relates to a ferrule retainer configuration which facilitates tool-less release from the connector body by moving an actuator axially. Specifically, Applicants have identified that tool-less ferrule retainers that must be squeezed tend to be impractical for high-density connector applications. Accordingly, Applicants disclose herein a configuration in which the ferrule retainer is released through an axial motion actuator. Because the ferrule retainer is releasably engaged to the connector body using an axially-manipulated actuator, there is no need to provide space on the sides of the connectors sufficient for fingers to access the ferrule retainer. Additionally, this configuration facilitates the use of materials, such as metals, in the ferrule retainer which are capable of withstanding high temperatures without significant degradation in their resiliency.

Accordingly, in one embodiment, the invention relates to a ferrule retainer which is releasable from a connector body through axial actuation. In one embodiment, the ferrule retainer retains a ferrule and a spring in a connector body, which defines at least one cavity and at least one first latch element adjacent the cavity, the ferrule retainer comprising: (a) a retainer body configured for insertion into the cavity; (b) a resilient member attached to the retainer body, the resilient member having a relaxed state, and comprising at least one second latch element configured for releasibly engaging the at least one first latch element; and (c) an actuator slidably mounted for forward and backward movement on the retainer body, the actuator having an actuated and an unactuated state, in the actuated state, the actuator bends the resilient member, thereby causing the at least one second latch element to move laterally relative to its position when the resilient member is in its relaxed state, and, in the unactuated state, the actuator does not significantly bend/flex the resilient member.

In another embodiment, the invention relates to connector having a tool-less ferrule retainer. In one embodiment, the connector has a front and rear origination and comprises: (a) a connector body having defining a cavity to receive a ferrule and at least one first latch element; (b) a ferrule disposed in the cavity; (c) a spring disposed behind the ferrule; and (d) a ferrule retainer for retaining the ferrule and the spring in the connector body, the ferrule retainer comprising at least: (i) a retainer body configured for insertion into the cavity; (ii) a resilient member attached to the retainer body, the resilient member having a relaxed state, and comprising at least one second latch element configured for releasibly engaging the at least one first latch element; and (iii) an actuator slidably mounted for forward and backward movement on the retainer body, the actuator having an actuated and an unactuated state, in the actuated state, the actuator bends the resilient member, thereby causing the at least one second latch element to move laterally relative to its position when the resilient member is in its relaxed state, and in the unactuated state, the actuator does not significantly bend/flex the resilient member.

DETAILED DESCRIPTION

Figure 1:
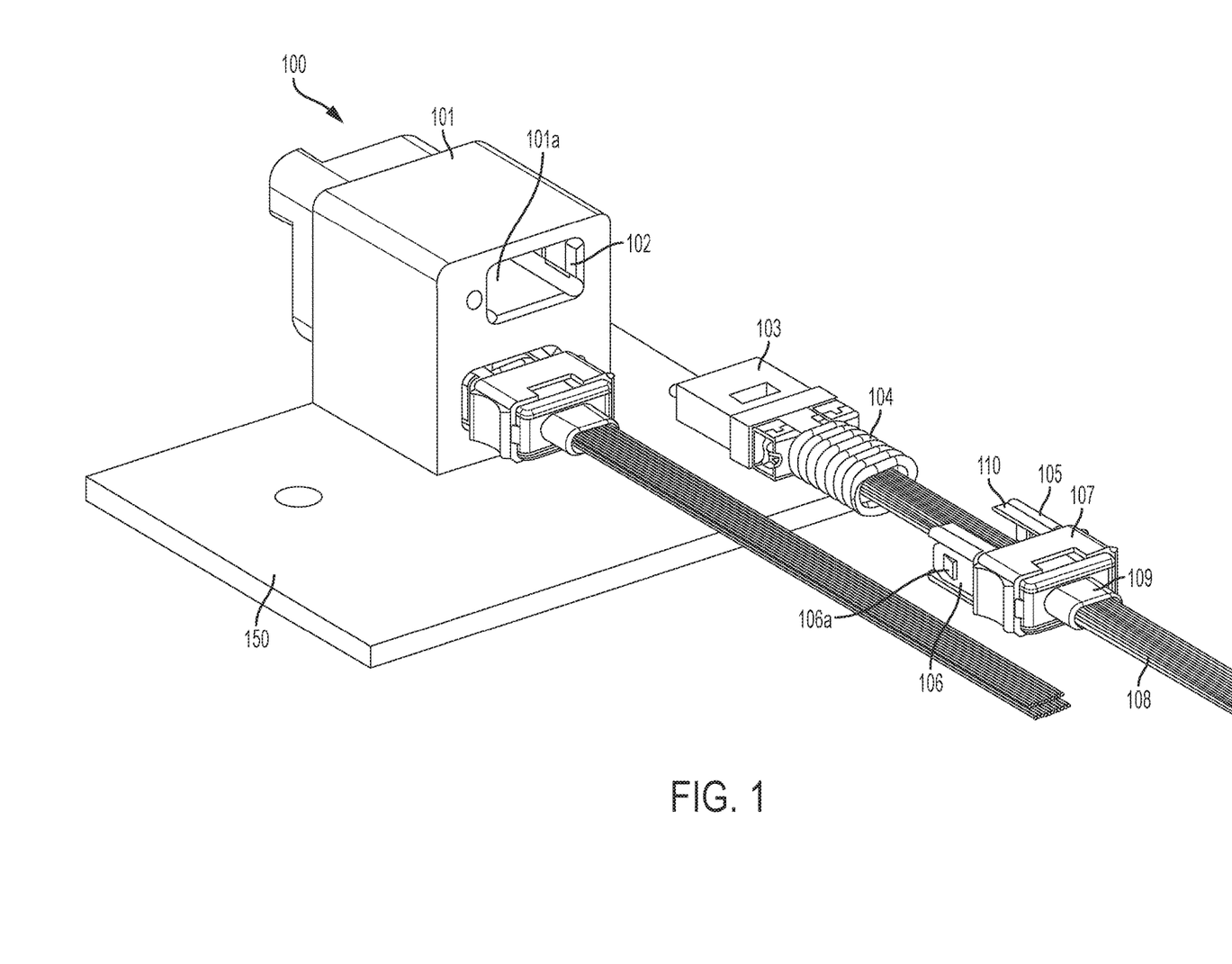
FIG. 1 shows one embodiment of the connector of the present invention in which upper one of the two ferrule assemblies is shown in a disassembled state, while the lower one is shown in an assembled state.
Figure 2:
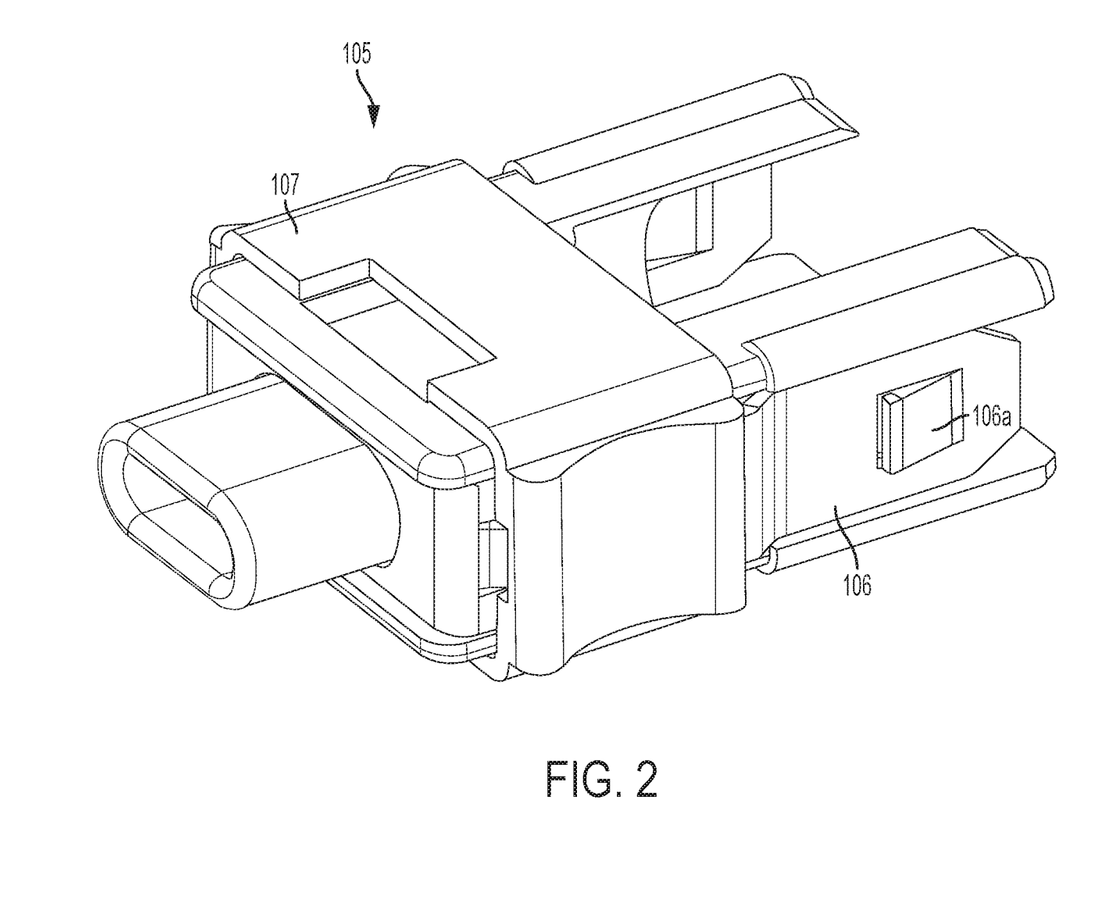
FIG. 2 shows a perspective view of one embodiment of the ferrule retainer of the present invention.
Figure 3:
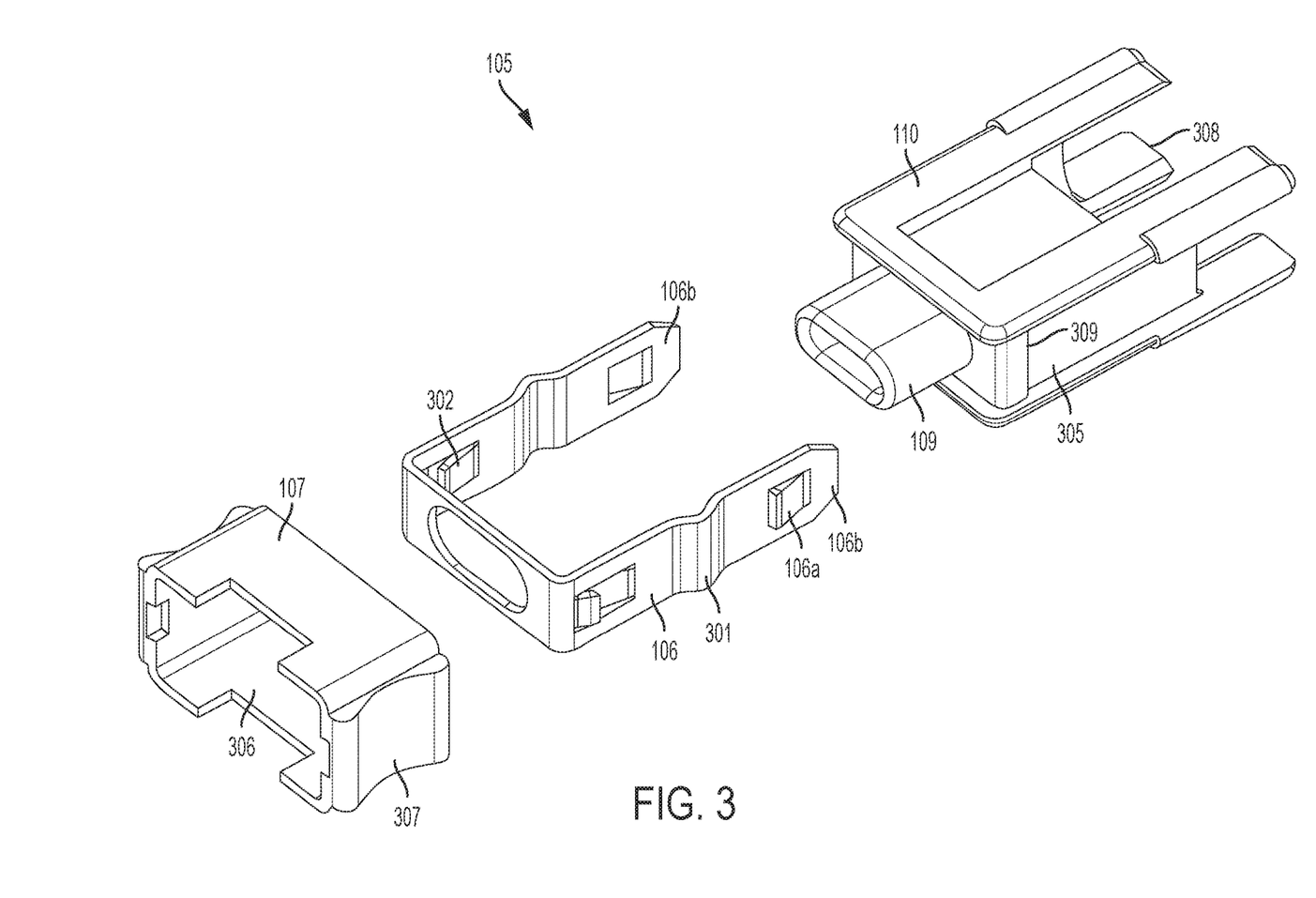
FIG. 3 shows an exploded view of the ferrule retainer of FIG. 2.
Figure 4:
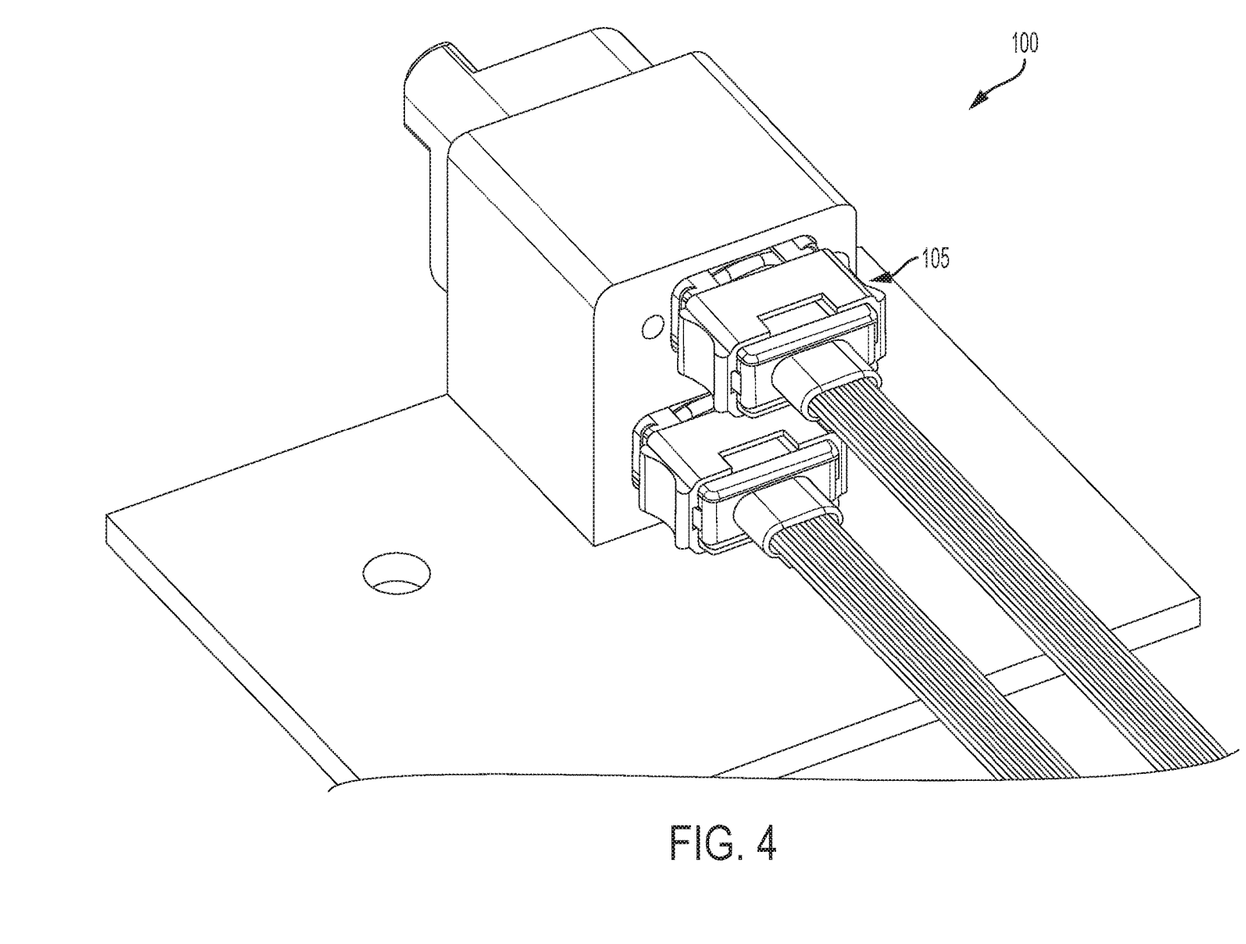
FIG. 4 shows the connector of FIG. 1 in which both ferrule assemblies are disposed in the connector body in an assembled state.
Figure 5:
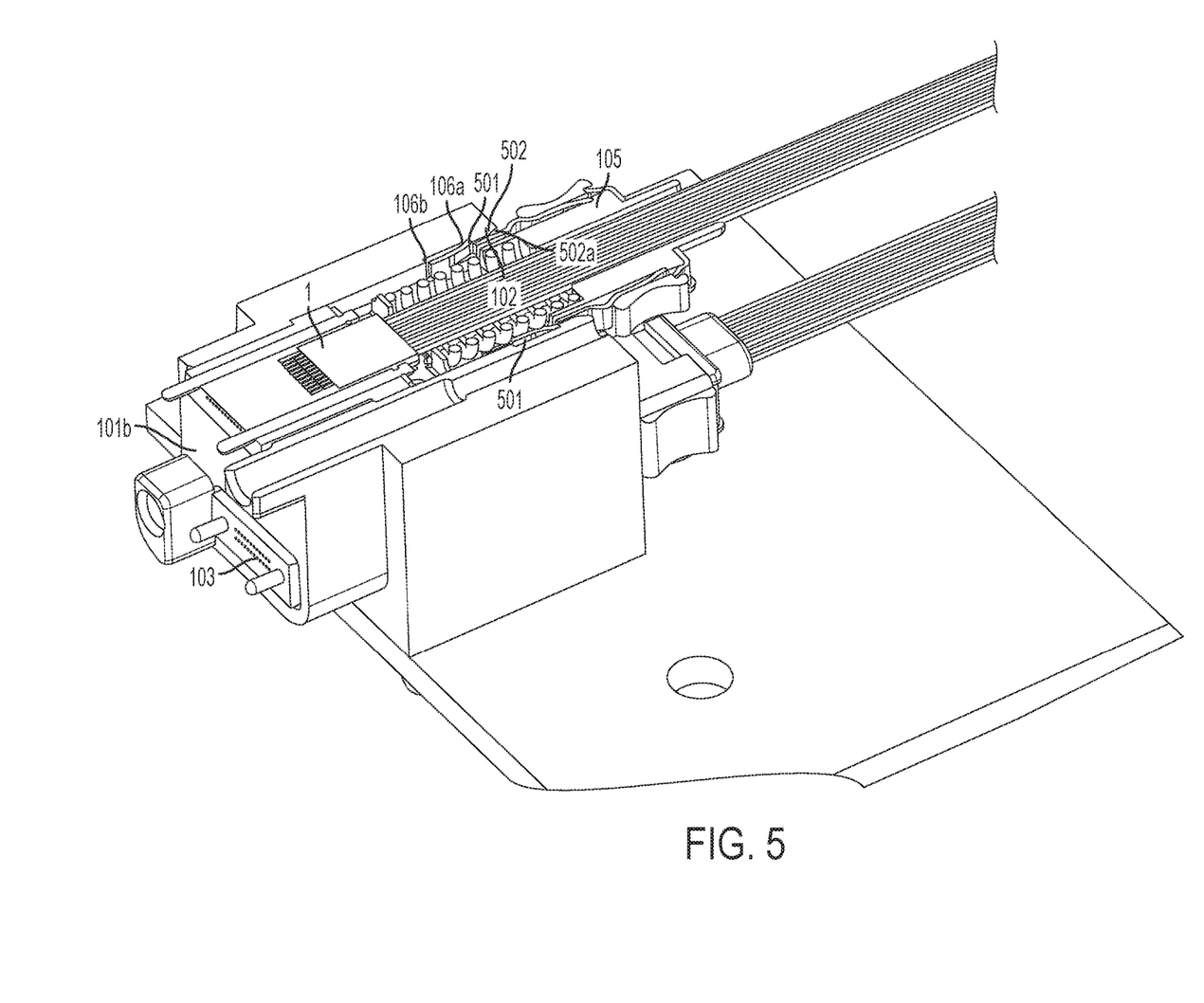
FIG. 5 shows a cross section of the connector of FIG. 4 in an unactuated state.

Referring to FIGS. 1 through 5, one embodiment of the connector 100 of the invention is shown. The connector 100 has a front and rear origination, and comprises a connector body 101 defining at least one cavity 101a to receive a ferrule 103, and having at least one first latch element 102 adjacent the cavity. In the assembled state, the ferrule 103 disposed in the cavity 101a as shown in the FIG. 5. A spring 104 is disposed behind the ferrule. A ferrule retainer 105 is used for retaining the ferrule and the spring in the connector body. Referring to FIG. 3, the ferrule retainer comprises at least a retainer body 110 configured for insertion into the cavity, and a resilient member 106 attached to the retainer body. The resilient member has a relaxed state, and comprises at least one second latch element 106a configured for releasibly engaging the at least one first latch element 102. The ferrule retainer also comprises an actuator 107 slidably mounted for forward and backward movement on the retainer body. The ferrule retainer has an actuated and an unactuated state. In the actuated state, the actuator bends the resilient member, thereby causing the at least one second latch element to move laterally relative to its position when the resilient member is in its relaxed state, and, in the unactuated state, the actuator does not significantly bend/flex the resilient member. Referring to FIG. 5, the ferrule retainer 105 is shown in the unactuated state, and referring to FIG. 6, the ferrule retainer 105 is shown in the actuated state.

These elements are described in greater detail below and in connection with selected alternative embodiments.

The connector body 101 of the present invention functions to house and support the ferrule and, in one embodiment, to anchor the connector to a structure such as a circuit board 150 as shown in FIG. 1, or backplane, as is known in the art. The connector body is similar to conventional connector bodies in form factor and materials of construction so the details of which will not be considered herein.

In one embodiment, the connector body has a first latch element 102 which cooperates with the second latch element of the resilient member as discussed in greater detail below. Specifically, referring to FIG. 5, a cross section of one embodiment of connector is shown. In particular, this cross section shows the interaction of the first and second latching elements. The first latching element 102, in this particular embodiment, is a recess 501 in the cavity side wall, adjacent the cavity. In this particular embodiment, the connector body also defines a lead-in portion 502 having a bevel 502A to facilitate the insertion of the second latching element 106A into the connector body (discussed below).

The first latch element can be any element known for mechanically engaging with a corresponding latching member. For example, as shown, the latch comprises a recess which is configured to receive a protrusion from the second latching element. Although in this embodiment, the first latching element is a recess and the second latching element is a protrusion, it should be understood that other embodiments are possible. For example, the protrusion and the recess can be reversed such that the protrusion is found on the connector body while the resilient defines a recessed for receiving the protrusion. Still other latching mechanisms will be obvious to those of skill in the art in light of this disclosure.

The configuration of the present invention facilitates the use of a connector body having multiple cavities for high-density connector configurations. For example, referring to FIG. 1, a connector body defines two cavities for receiving ferrule assemblies is shown. However, it should be understood that the connector body of the present invention is suitable for many more cavities in close proximity to one another. For example, the connector body could be configured with cavity arrays of 2×2, 3×3, 4×4, 2×4, etc. Furthermore, because the ferrule retainer is releasably engaged to the connector body using an axially-manipulated actuator, there is no need to provide space on the sides of the connectors sufficient for fingers to access the ferrule retainer. Indeed, in one embodiment, the connectors are arranged side-by-side in a touching/near-touching proximity. Such a configuration is generally not possible with tool-less ferrule retainers that need to be actuated by squeezing as discussed above.

Still other embodiments of the connector body will be obvious of skill in the art in light of this disclosure.

The ferrule functions to align and present the terminated fiber ends to a mating device, which may be another connector or an optical device. The ferrule may be a single-fiber ferrule or multifiber ferrule. In one embodiment, the ferrule is a standard/conventional ferrule, such as, for example, an MT ferrule, without any modifications. Indeed, one aspect of the invention is that many of the same components of a standard connector can be used in the connector of the present invention. Accordingly, there is no need to describe the details of the ferrule herein.

In one embodiment, the connector 100 comprises a spring 104 which functions to urge the ferrule forward in the connector body to provide a forward urging force during mating. The spring, in one embodiment, is a conventional, standard spring. Accordingly, the details of which will not be discussed herein. It should be understood that, although the connector 100 is shown herein with a spring, the spring is not required. For example, in certain applications a spring is not required because the mating connector provides adequate an urging force against the ferrule 103, as is known in the art.

The ferrule retainer functions to contain the ferrule in the connector body and, in one embodiment, to provide a backstop for the spring which urges the ferrule forward within the connector body cavity as mentioned above. The conventional function of ferrule retainers is well-known and will not be discussed in detail herein. However, the ferrule retainer as disclosed herein differs from conventional ferrule retainers in a number of ways, including its ability to be released from the connector body through axially actuation.

Referring to FIGS. 2 and 3, one embodiment of the ferrule retainer 105 is shown. In this embodiment, the ferrule retainer comprises three discrete components, a retainer body 110, resilient member 106 and an actuator 107.

In one embodiment, the retainer body 110 functions to receive a back end of the spring and to provide support for the resilient member and the actuator. In one embodiment, the ferrule retainer body comprises a conventional front end 308, which is configured to receive and hold the back end of the spring.

In one embodiment, the retainer body comprises a channel 305 defined along its periphery to receive/accommodate the resilient member 106. Although the ferrule retainer body 100 is disclosed in FIG. 3 with a channel 305, it should that other embodiments are possible. For example, the resilient member could be adhered to the retainer body, or the retainer body may comprise mechanical interlocks to hold the resilient member 106 in place. Still other embodiments will be obvious to those of skill in the art in light of this disclosure.

In one embodiment, the retainer body comprises a collar 109 or other conduit through which the optical fibers 108 pass.

The resilient member functions to provide resiliency to urge the second latch element toward the first latch element when the ferrule retainer is engaged with the connector body. To this end, in one embodiment, the resilient member 106 comprises distal ends 106B which are free (i.e., not secured to the retainer body), allowing them to move laterally. The second latching element 106A is disposed or defined in the resilient member proximate to the distal end 106B such that when the connector is actuated and the distal ends move laterally, the second latch element also moves laterally. In the embodiment shown in FIG. 3, the second latch element 106A is defined by punching a portion of the resilient member and lifting it to define an outwardly protruding second latch element 106A.

Likewise, in one embodiment, tabs 302 for securing resilient member 106 to the retainer body 110 are defined by punching a portion of the resilient member and bending/flexing it inwardly to define an inwardly protruding tab. The retainer body 110 has a corresponding shoulder 309 against which the tab urges to keep the retainer in place on the retainer body.

The resilient member 106, in one embodiment, comprises at least one cam surface 301 for cooperating with the actuator 107 such that, when the actuator 107 is pushed over the cam surface 301, it causes the resilient member 106 to deform/bend. In this particular embodiment, the resilient member is configured to bend/flex inwardly in the actuated state. It should be understood, however, that the cam surface 301 could be configured in different ways to cooperate with the actuator 107 in different ways. The interaction of the cam surface and the actuator is described in greater detail below.

The resilient member 106 comprises a material that is capable of bending and/or flexing without deformation. In one embodiment, the resilient member 106 comprises a metal which is stamped into form. Such an embodiment is particularly well suited for high temperature applications compared to conventional polymeric ferrule retainer configurations which tend to lose their resiliency over time due to high temperature. The type of metal that can be used can vary, in one embodiment, the metal is stainless steel. Still other embodiments will be obvious to those of skill in the art in light of this disclosure.

Figure 6:
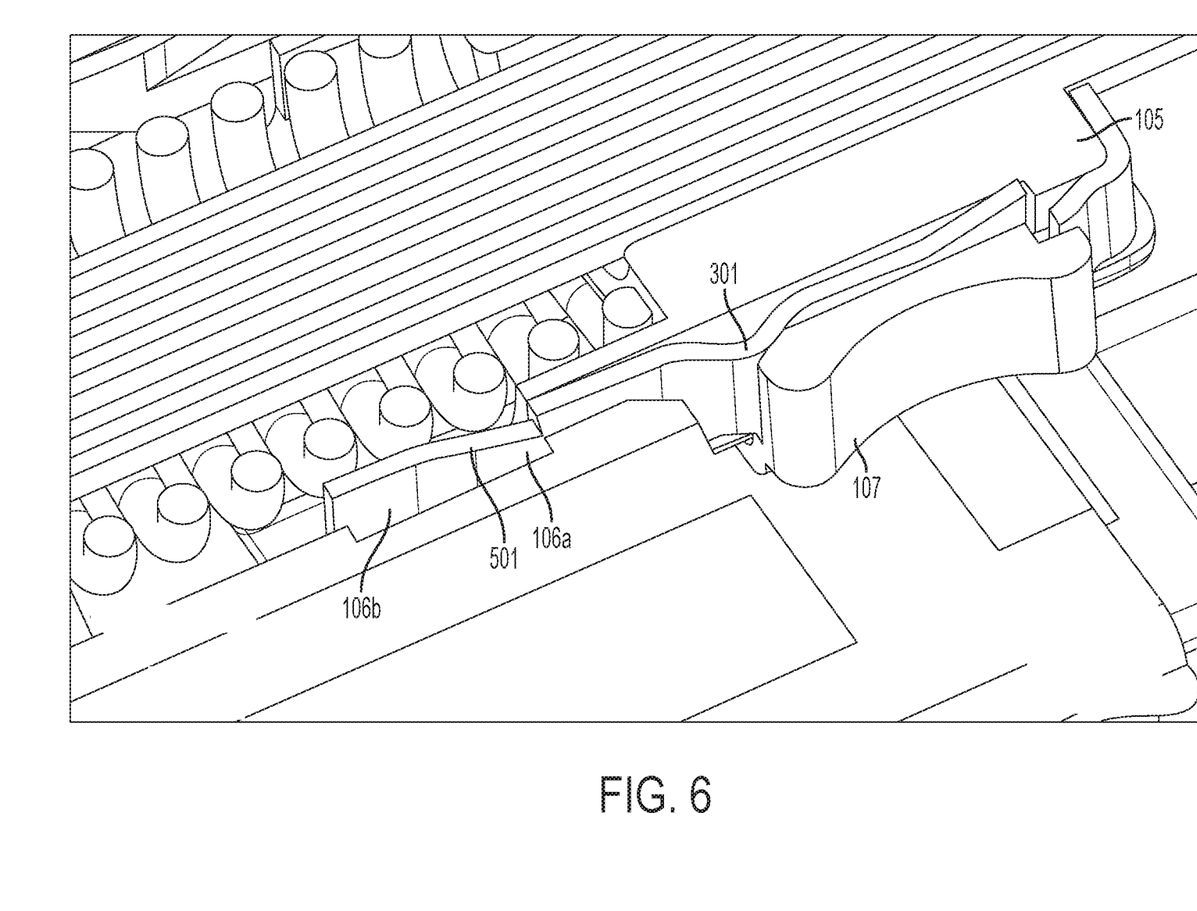
FIG. 6 shows a cross section of the connector of FIG. 4 in an actuated state.

The actuator 107 functions to cooperate with the resilient member to move the second latch element laterally between an unactuated state and an actuated state. In one embodiment, the actuator is slidably mounted on the ferrule retainer body 110 such that it slides axially, or in other words, forward and backward (as opposed to lateral motion). In other words, the actuator is configured such that its axial motions causes the second latch element to move laterally and away from the first latch element such that the latching elements disengage allowing the ferrule retainer 105 to be withdrawn as shown in FIG. 6. The configuration of the actuator 107 can vary according to the application. In one embodiment, the actuator 107 is sleeve-like and envelopes the rear portion of the ferrule retainer body. In one embodiment, the actuator 107 is configured to accommodate a user's fingers or a tool with certain contours in its exterior. For example, in embodiment of FIG. 3, the actuator 107 comprises a pair of finger contours 307 on either side to accommodate a user's fingers. Alternatively, or in addition to the finger contours 307, the actuator 107 may comprise a notch 306 that receives a simple tool, for example, the end of a straight slot screwdriver. Such an embodiment may be preferable in applications in which the connectors are arranged in a high-density configuration. With such an embodiment, the user would insert a common tool like a screwdriver into the slot 306, and then use the screwdriver to push the actuator 107 forward into its actuated state to remove the ferrule retainer.

The actuator and the resilient member are configured to cooperate such that in the actuated state, the distal ends 106B of the resilient member 106 are moved laterally from their at rest position, thereby facilitating disengagement with the first latch members. This could be accomplished in different ways. For example, in the embodiment shown in FIG. 3, the actuator is configured to move the distal ends 106B inwardly during actuation. In this embodiment, the resilient member comprises a protrusion of cam surface 301 which cooperates with the corresponding surface of the actuator 107. Specifically, as the actuator 107 is pushed forward, it rides over the cam surface 301, which causes the distal ends 106B to deflect inwardly as shown in FIG. 6. Because the second latch elements 106A are located proximately to the distal ends 106B, when the distal ends 106B move inwardly, so do the second latch elements thereby facilitating disengagement with the first latch element. Alternatively, the actuator and the resilient member could be configured such that the actuator slides inwardly on the inside of the resilient member. In this such configuration, the cam surface would protrude inwardly rather than outwardly. Thus, as the actuator is slid forward, it would contact the inwardly protruding cam surfaces to urge the distal ends 106B outward. In yet another embodiment, the actuator is actuated by moving backward (rather than forward) to contact a cam surface on the resilient member. Still other embodiments will be known or obvious to those of skill in the art in light of this disclosure.

The installation of the ferrule retaining body is straightforward. Referring to FIGS. 1 and 5, the installation of a ferrule in the connector body will be discussed. A ferrule 103 terminated with optical fibers 108 is inserted in the cavity 101A of connector body 101. The ferrule 103 is pushed forward such that its face is presented at the front surface 101B of a connector as shown in FIG. 5. In one embodiment, the face of the ferrule 103 slightly protrudes from the front face 101B of the connector body. This is a typical and well known configuration of a ferrule within a connector body. Next, a spring 104 is disposed behind the ferrule and around the optical fibers 108. The ferrule retainer 105 is then disposed behind the spring 104 and also around the fibers 108. The ferrule retainer 105 is pushed forward within the cavity, thereby compressing the spring 104. As the distal ends 106B of the resilient member 106 are pushed into the cavity, they deflect inwardly as they contact the bevel surface 502A of the lead-in portion 502 of the connector body. Because the resilient member is flexible, it is able to deflect inwardly as the ferrule retainer is pushed into the cavity. Once the second latch element 106A reaches the first latch element 102, which, in this embodiment is a recess 501, it is able to spring back outwardly such that the second latch element 106A is forced into the recess 501, thereby preventing the ferrule body from being withdrawn without actuation.

During actuation, as discussed above, the actuator is pushed forward such that the distal ends 106B move inwardly to a point where the second latch elements 106A are longer disposed within the recess 501, thereby allowing the ferrule assembly/ferrule retainer to be pulled out of the cavity 101.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A connector having a front and rear origination and comprising:
    a connector body having defining a cavity to receive a ferrule and at least one first latch element;
    a ferrule disposed in said cavity;
    a spring disposed behind said ferrule; and
    a ferrule retainer for retaining said ferrule and said spring in said connector body, said ferrule retainer comprising at least:
        a retainer body configured for insertion into said cavity;
        a resilient member attached to said retainer body, said resilient member having a relaxed state, and comprising at least one latch element configured for releasably engaging said at least one first latch element; and
        an actuator slidably mounted for forward and backward movement on said retainer body, said actuator having an actuated and an unactuated state, in said actuated state, said actuator bends said resilient member, thereby causing said at least one second latch element to move laterally relative to its position when said resilient member is in its relaxed state, and in said unactuated state, said actuator does not significantly bend/flex said resilient member.

2. The connector of claim 1, wherein said first latch element is a recess and said second latch element is a latch.

3. The connector of claim 2, in said actuated state, said actuator bends said resilient member inwardly such that said latch does not extend into said recess, and, in said unactuated state, said release does not substantially interfere with said resilient latch, allowing said resilient latch to urge against said connector body such that said latch extends into said recess.

4. The connector of claim 1, wherein said connector body defines multiple cavities.

5. The connector of claim 1, wherein said unactuated state, said resilient member is in its relaxed state.

6. The connector of claim 1, wherein said resilient member comprises at least one distal end and said at least one second latch element is disposed proximate to said distal end.

7. The connector of claim 1, wherein said resilient member comprises two distal ends, and said at least one second latch element comprises a second latch element located proximate to each of said two distal ends.

8. The connector of claim 1, wherein said resilient member comprises at least one cam surface, said actuator and said at least one cam surface configured such that as said actuator moves axially to its actuated state, the actuator slides on said cam surface causing said at least one distal end to move laterally.

9. The connector of claim 1, wherein said cam surface comprises an outwardly protruding surface such that said at least one distal end moves laterally inwardly.

10. The connector of claim 1, wherein said resilient member comprises metal.

11. The connector of claim 1, wherein, in said actuated state, said actuator bends said resilient member such that said at least one second latch element moves laterally inward relative to its position when said resilient member is in its relaxed state.

12. The connector of claim 1, wherein said resilient latch is a discrete component.

* * * * *